United States Patent
Hooker

[11] Patent Number: 5,896,780
[45] Date of Patent: Apr. 27, 1999

[54] DRIVE ASSEMBLY

[76] Inventor: Christopher J. Hooker, 53 Francis Avenue, West Howe, Bournemouth, Dorset, United Kingdom

[21] Appl. No.: 08/754,552

[22] Filed: Nov. 21, 1996

[30] Foreign Application Priority Data

Nov. 21, 1995 [GB] United Kingdom ............... 9523772

[51] Int. Cl.[6] ........................................ F16C 1/28
[52] U.S. Cl. ................. 74/502.3; 74/500.5; 74/501.5 R
[58] Field of Search ................ 74/500.5–502.6; 474/154, 203

[56] References Cited

U.S. PATENT DOCUMENTS

| | | | |
|---|---|---|---|
| 2,387,729 | 10/1945 | Harvlie | 74/502.3 X |
| 2,441,719 | 5/1948 | Potter | 74/502.3 |
| 3,298,243 | 1/1967 | Geissler et al. | 74/502.3 |
| 3,858,578 | 1/1975 | Milo | 128/20 |
| 3,965,802 | 6/1976 | Jacobs | 74/502.3 X |
| 4,609,365 | 9/1986 | Eberle | 474/154 |
| 4,656,780 | 4/1987 | Miyauchi et al. | 49/348 |
| 5,006,097 | 4/1991 | Cook | 474/154 |
| 5,159,849 | 11/1992 | Womack | 74/502.3 |
| 5,488,881 | 2/1996 | Lin | 74/502.3 |

FOREIGN PATENT DOCUMENTS

| | | | |
|---|---|---|---|
| 707843 | 4/1996 | European Pat. Off. | |
| 1333515 | 7/1963 | France | 74/502.3 |
| 219506 | 7/1924 | United Kingdom | 74/502.3 |
| 418370 | 10/1934 | United Kingdom | 74/502.3 |
| 1417248 | 12/1975 | United Kingdom . | |
| 2279120 | 12/1994 | United Kingdom . | |

*Primary Examiner*—Vinh T. Luong
*Attorney, Agent, or Firm*—Pillsbury Madison & Sutro LLP

[57] ABSTRACT

A drive assembly has a transmission arrangement including a plurality of portions and a wire connecting the portions in the longitudinal direction while allowing limited pivotal movement of the portions transversely to the longitudinal direction. A guide tube guides the transmission arrangement around a curve, A drive motor pushes the transmission arrangement along the guide tube to cause the transmission arrangement to extend from the guide tube to apply a thrust drive force. The drive assembly can be used in a bath aid unit.

6 Claims, 2 Drawing Sheets

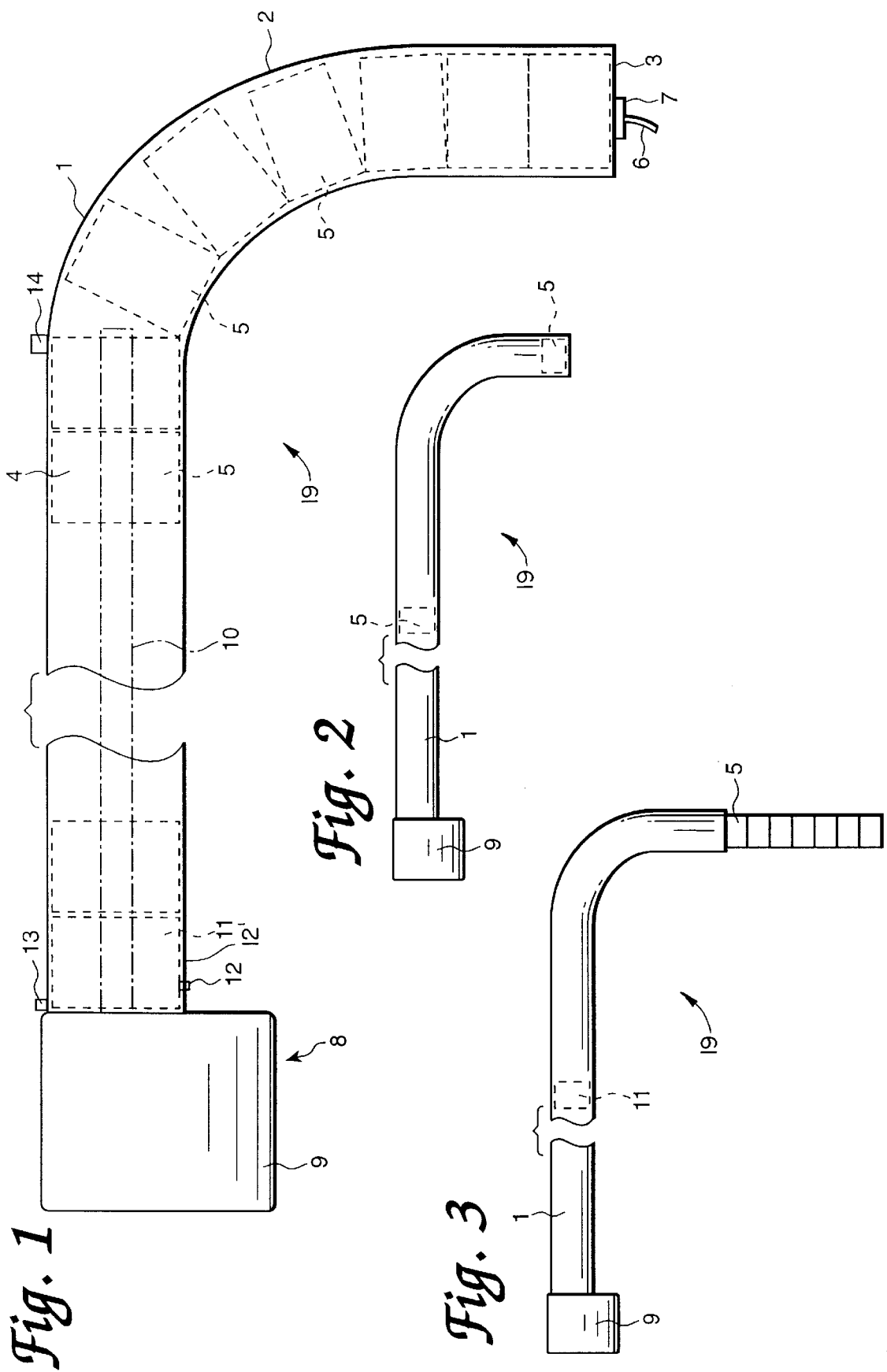

DRIVE ASSEMBLY

FIELD OF THE INVENTION

The present invention relates generally to a drive assembly and more particularly but not exclusively to a drive assembly for use in a bath aid unit for enabling for example disabled or elderly people to bathe more easily, by lifting them into and out of a bath.

BACKGROUND OF THE INVENTION

Disabled and elderly people often encounter some difficulty in taking a bath, more specifically in climbing into and out of the bath. Physical difficulties may frequently require a disabled or elderly person to be assisted by a helper and, if that person is not readily available, the disabled or elderly person cannot take a bath or may be able to do so only at the cost of such severe physical exertion that it is almost impossible to bathe.

One form of such a bath aid unit or bath lift involves a support structure which rests on the bottom of the bath and a seat which is displaceable between a raised and a lowered position relative to the part of the bath aid unit which is supported on the bath. The seat is displaceable between its raised and lowered positions by a drive arrangement, for example a manually operable drive or a powered actuating unit comprising an electric motor which can be energised to raise the seat in the bath. The actuating unit may include a rigid screw rod member which bears against the bottom of the bath in such a way that, when the electric motor is powered, the actuating unit lifts the seat by pressing downwardly on the rod member. However, as the rod member is rigid, when the seat is lowered into the downward position where it is adjacent the bottom of the bath, the rigid rod member projects upwardly beyond the top of the seat by a considerable distance and can thus constitute a serious obstacle to free movement of the person sitting on the seat. For example, when the person using the bath aid unit is sitting on the seat, in its lowered position, that person cannot lie back in the water in the bath or indeed cannot readily wash his or her back because of the presence of the rigid rod.

SUMMARY OF THE INVENTION

An object of the present invention is to provide a drive assembly of a compact design configuration, which does not suffer from the above-indicated disadvantages.

Another object of the invention is a drive assembly which can be used, for example, for a bath aid unit and which is of a simple but operationally reliable structure while producing a substantial drive force.

Still another object of the present invention is a bath aid unit of a compact design while nonetheless affording a considerable range of heightwise movement.

According to the present invention the foregoing and other objects are achieved by a drive assembly comprising an elongate transmission arrangement comprising a plurality of portions and means connecting the portions together in the longitudinal direction of the transmisson arrangement while allowing limited pivotal movement of the portions transversely to the longitudinal direction. A guide means guides the transmission arrangement movably therealong, the guide means having a first end and a second end and including a curve portion for changing the direction of movement of the transmission arrangement. A drive means is disposed at least adjacent the first end of the guide means and is operable to displace the transmission arrangement with a thrust force along the guide means towards the second end thereof whereby operation of the drive means causes the transmission arrangement to move along the guide means and extend from the second end thereof to apply a thrust drive force.

According to the invention the foregoing and other objects are further attained by a bath aid unit comprising a seat member on which a user can sit, a support frame structure for carrying the seat member and arranged to be supported by a bath, the support frame structure being displaceable between a first condition in which the seat member is raised from the bottom of the bath and a second condition in which the seat member is lowered at least substantially to the bottom of the bath, and a drive assembly in accordance with the preceding paragraph, wherein the part of the transmission arrangement which is extended from the guide means at the second end is capable of providing support for a raising movement of the seat member from its lowered condition towards its raised condition.

Accordingly the guide means guides the transmission arrangement along an at least partly curved path of movement such that the line of the transmission arrangement is turned through an angle defined by the curved portion of the guide means. The drive means includes a thrust member operable to bear against one end of the transmission arrangement adjacent the first end of the guide means to displace the transmission arrangement along the guide means when the drive means is actuated for driving operation of the assembly whereby a part of the transmission arrangement is extended from the guide means so that the portions of the extended part of the transmission arrangement form a substantially rigid construction to produce the drive force of the assembly.

In a preferred feature of the invention the transmission arrangement comprises a plurality of round bobbin-like portions and the connecting means comprise at least one wire extending through the round portions to hold the round portions together in the longitudinal direction of the transmission arrangement.

A further preferred feature of the invention provides that the guide means is a tube within which the transmission arrangement is slidable, the tube having a bend configuration to provide the curved portion of the guide means.

The drive means preferably includes a drive motor such as an electric motor operable to rotate a screwthreaded rod, and a nut which is carried on the screwthreaded rod and which co-operates with a suitable structural portion to prevent rotation of the nut whereby when the screwthreaded rod is rotated by actuation of the motor the nut is displaceable along the screwthreaded rod, thereby to cause displacement of the transmission arrangement.

A further preferred feature of the invention provides stop means to restrict the movement of the transmission arrangement in relation to the guide means, by suitably switching off the drive means at appropriate positions.

When the drive assembly according to the invention is used in a bath aid unit, the guide means may be defined by a passage or channel provided in the seat member of the bath aid unit, for example by being integrally moulded therein. In that case the guide means may be of a somewhat meander-like configuration, for example it may extend from the drive means such as an electric motor at a position towards the rear of the seat member in a forwards direction towards the front edge of the seat member where it then curves through approximately 180° to continue extending then towards the rear edge of the seat member, wherein at a position adjacent the rear edge of the seat member the guide means curves through approximately 90° whereby that second end of the guide means faces downwardly so that portions of the transmission arrangement which issue from that second end of the guide means upon raising actuation of the drive assembly constitute a rigid column structure to support the seat member in a raised condition thereof. The above-described configuration of the guide means affords provides a considerable length of guide means and thus allows the transmission arrangement to be of considerable length to afford an adequate raising height for moving the seat member between its raised and lowered conditions.

In another preferred feature of the invention, a spring may be included in the line of portions constituting the transmission arrangement to hold them together under the spring loading. The spring may be disposed at the end of the above-mentioned screwthreaded rod forming part of the drive means or at any other location in the line.

The portions constituting the transmission arrangement may be held together by at least one wire, as indicated above, but it is also possible to provide, for example, first and second wires which extend through the portions of the transmission arrangement over a substantial part of the length thereof, while the remainder of the length of the transmission arrangement has the portions constituting same held together by a single wire, more especially where the transmission arrangement passes around the curved portion of the guide means.

The round bobbin-like portions constituting the transmission arrangement may be shaped to interengage with each other, for example with a cone at one end of each such portion and a corresponding recess at the other end, thereby to provide for lateral restraint of the portions relative to each other.

In another alternative configuration of the drive assembly, the transmission arrangement may comprise a plurality of rods extending through a tubular guide means along the length thereof, with suitable binding means operable to hold the plurality of rods together in a bunch so that as the rods issue from the guide means they are restrained from lateral spreading movement, whereby they can form a rigid column structure to exert the drive force required.

Further objects and features of the invention will be apparent from the following description of preferred embodiments.

BRIEF DESCRIPTION OF THE DRAWING

FIG. 1 is a side view in partial section of a drive assembly according to the invention, FIG. 2 is an even more diagrammatic side view of part of the FIG. 1 drive assembly in a first operation condition, FIG. 3 is a view corresponding to FIG. 2 showing the drive assembly in a second operating condition.

DESCRIPTION OF PREFERRED EMBODIMENTS

Figure 4:
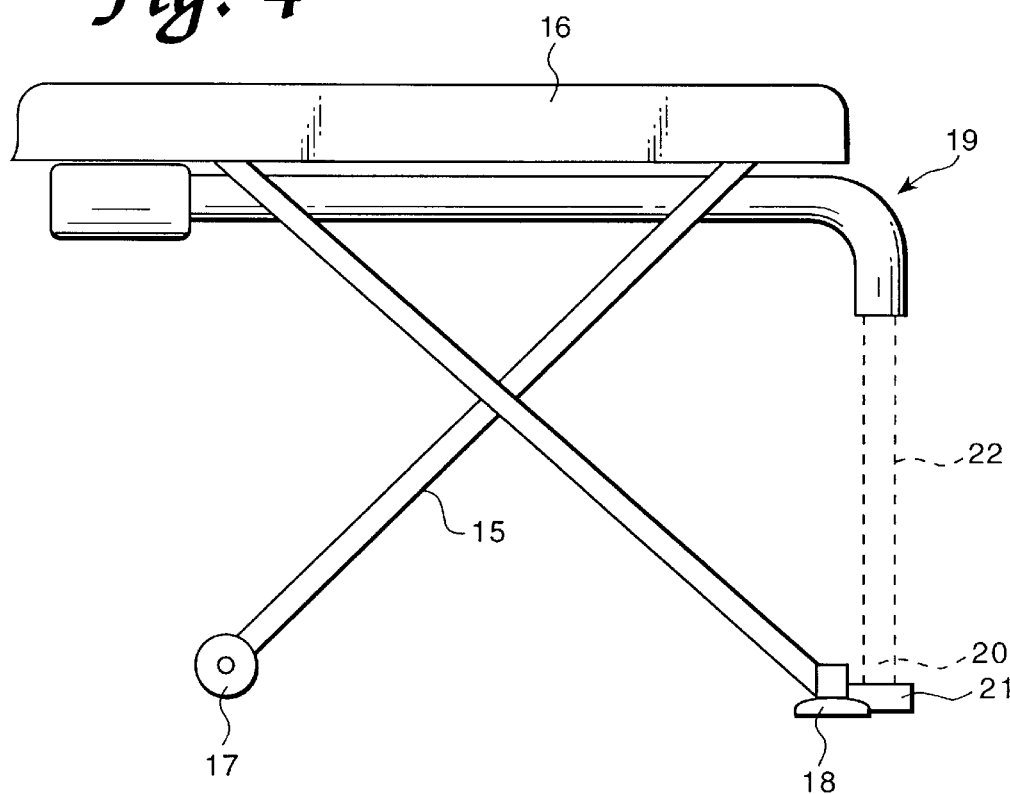
FIG. 4 is a side view of a bath aid unit incorporating the drive assembly shown in FIG. 1.

Referring firstly to FIG. 1, shown therein is a drive assembly 19 according to the invention comprising a guide member 1 in the form of an elongate tube having a bend portion as generally indicated at 2 terminating at a free end 3. The tube may be of a round or other suitable transverse cross-sectional configuration.

The illustrated drive assembly further comprises a transmission arrangement as generally indicated at 4, which extends within the guide tube 1 and which, as shown, includes a plurality of separate portions 5 which are of an external cross-sectional configuration corresponding to the internal cross-sectional configuration of the tube 1. The portions 5 may be, for example, of round cross-section and may thus be referred to as bobbins. The illustrated length of the transmission arrangement 4 is shown only by way of example.

The portions or bobbins 5 are held together as a line by means of a suitable retaining member such as a strong cable or wire, illustrated in the form of a broken line 6 which extends through bores provided through the centre of each of the bobbins 5 and which extends to the end of the transmission arrangement 4 where it projects therefrom. Alternatively, the bobbins 5 may be held together in the same way by two cables or wires which extend therethrough in the same manner.

The wire 6 has a stop as illustrated at 7 at the end of the transmission arrangement such as to ensure that the bobbins 5 are firmly pressed against each other so that there is reasonably minimal play in the longitudinal direction of the transmission arrangement 4 over the entire length thereof, as between the various bobbins making up the transmission arrangement 4.

The drive assembly 19 further includes a drive means, as generally indicated at 8, comprising a drive motor 9 such as an electric motor and, if appropriate, a suitable reduction gearbox (not shown) operatively connected to the motor 9. The drive means 8 further includes a screwthreaded rod 10 which extends through the centre of the tube 1 over at least a part of the straight portion thereof and through the centre of bobbins 5 which are disposed in that straight portion of the tube 1. Carried on the screwthreaded rod 10 is a nut 11 which has a projection 12 thereon co-operating with a slot 12' in the tube 1 so that the nut 11 is not rotatable relative to the tube 1 but is displaceable along the tube 1 in the longitudinal direction thereof. The nut 11 is thus illustrated as being disposed at one end of the transmission arrangement 4, for example in contact with the adjoining portion 5 of the transmission arrangement 4.

Reference numeral 13 denotes a stop which is suitably mounted on the drive assembly, for example by being carried on a part of the tube 1 adjoining the motor 9, while reference numeral 14 denotes another stop which is disposed at a location operatively adjacent the end of the screwthreaded rod 10 which extends through the straight part of the tube 1. The stops 13 and 14 co-operate with the nut 11 when the nut 11 is at the left-hand end of the screwthreaded rod 10 in FIG. 1 and at the right-hand end of the screwthreaded rod 10 in FIG. 1, so that they constitute travel-limiting stops by switching off the motor 9 when the nut 11 reaches the extreme left-hand position on the screwthreaded rod 10 and the extreme right-hand position adjacent the right-hand end of the screwthreaded rod 10.

It will be seen therefore that actuation of the motor 9 causes the nut 11 to be screwed along the screwthreaded rod 10 by virtue of the screwthreaded rod 10 being driven in rotation by the motor 9. When the motor 9 is actuated to displace the nut 11 towards the right in FIG. 1, the nut 11 thus pushes the transmission arrangement 4 consisting of the bobbins 5 towards the right in FIG. 1 and thus also around the bend portion 2 of the tube 1 as the portions 5 assume the relative tilted positions around the curve portion 2, as shown in FIG. 1. This operation of the drive assembly will be described in greater detail hereinafter. The wire 7 is such as to hold the portions 5 together in a line constituting the transmission arrangement, while nonetheless permitting the portions 5 to adopt the tilted positions illustrated.

When the motor 9 is actuated to cause the nut 11 to move along the screwthreaded rod 10 towards the right-hand end thereof, the cooperation of the nut 11 and the stop 14 will stop the motor 10 at that end of the rod 10, unless the motor 9 is previously switched off by the operator of the drive assembly who actuates a main control switch. Similarly, when the nut 11 is moved along the rod 10 towards the left in FIG. 1, co-operation of the nut 11 and the stop 13 will also switch off the motor 9.

When the motor 9 is actuated to move the nut 11 towards the left in FIG. 1 along the rod 10, the portions 5 of the transmission arrangement will be retracted into the tube 1 by sliding round the bend portion 2 and into the straight portion of the tube 1, for example under the effect of an upward force applied to the end of the transmission arrangement 4, which faces downwardly in FIG. 1.

Reference will now be made to FIG. 2 showing the drive assembly in an operating condition in which the nut 11 is towards the motor 9 and the transmission arrangement 4 is thus retracted within the tube 1. When the motor 9 is actuated to displace the nut 11 towards the right in FIG. 1, the transmission arrangement 4 is thus extended from the guide tube 1 and assumes the second operating condition shown in FIG. 3 in which the bottom portion 5 of the transmission arrangement 4 can apply a suitable thrust force. The drive assembly in the condition shown in FIG. 3 thus has a part of the transmission arrangement extending from the guide tube so that the portions 5 of that part form a substantially rigid column structure to produce the drive force of the assembly.

Reference will now be made to FIG. 4 showing the drive assembly described above, in associated with a bath aid unit for enabling for example an elderly or disabled person to climb into and out of a bath. The bath aid unit thus comprises a pivoted scissor-type frame structure diagrammatically indicated at 15 and a seat member 16. The bottom ends of the legs of the frame structure 15 are designed to rest, for example, on the bottom of a bath and the seat member 16 can thus move between a raised position as illustrated and a lowered position in which the seat member 16 is moved down to a position closely adjacent to the bottom of the bath. Reference numeral 17 indicates rollers at the bottom ends of the frame structure 15 to facilitate the raising and lowering movement of the seat member 16, while reference 18 denotes suction cups designed firmly to locate the bath aid unit in the bath. Indicated generally at 19 is a drive assembly as described above in detail with reference to FIGS. 1 to 3, which is mounted on the seat member 16 at the underside thereof. The transmission arrangement 4 has its lower end 20 fixed in position, for example to a suitable part of the frame structure as indicated at 21, to ensure that the arrangement 4 forms a substantially rigid support solumn structure 22 in an at least substantially vertical position.

It will be seen that in the raised position of the bath aid unit illustrated in FIG. 4, the drive assembly 19 is in the position illustrated in FIG. 3, with the bobbins 5 constituting the rigid support column 22 operable to hold the seat member 16 in its raised position. When the seat member 16 is to be lowered, the drive assembly 19 is simply operated in such a way that the transmission member 4 moves into the retracted position shown in FIG. 2 so that the seat member 16 is then closely adjacent to the bottom of the bath. In that configuration, therefore, there is no part of the transmission arrangement 4 which projects upwardly at the back of the seat member 16, with the attendant disadvantages that such projection involves.

It will be appreciated that, when the drive assembly 19 is used with the bath aid unit, suitable sealing means will be provided to ensure that the drive assembly 19 continues to operate satisfactorily, even when fully submerged in the bath water. In that respect, however, it is generally only necessary to ensure that the motor 9 is sealed as the remainder of the drive unit 19 involving the guide tube 1, transmission arrangement 4 and the drive means can be readily immersed in water without being adversely affected. The bobbin portions 5 constituting the transmission arrangement 4 for example, may be made of polypropylene or acetal thermoplastic resin, or other suitable material.

Figure 5:
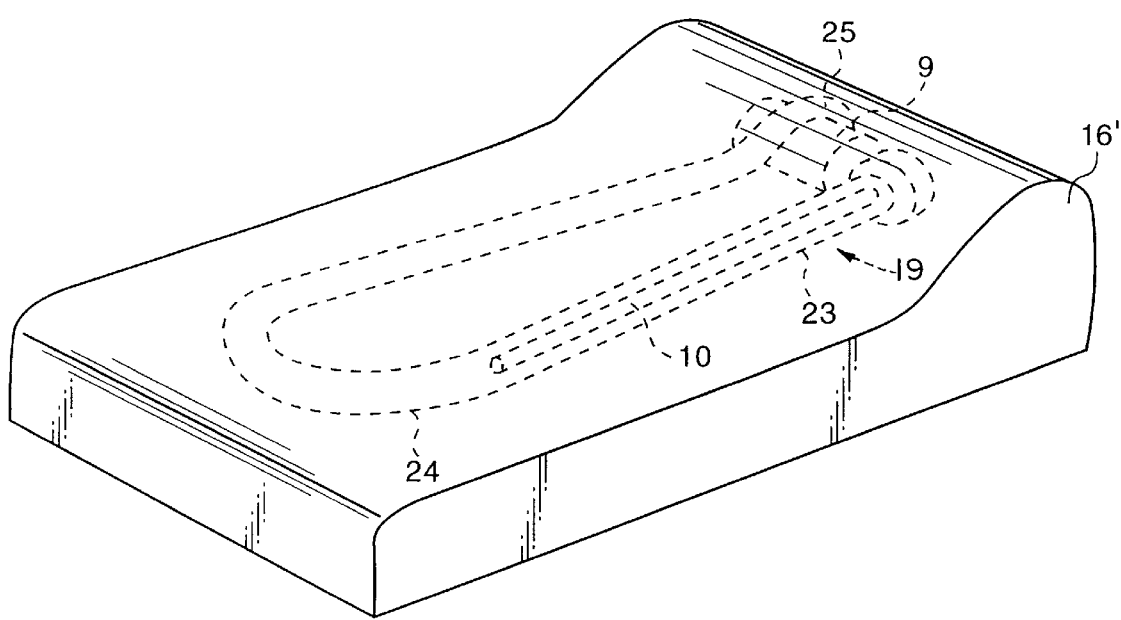
FIG. 5 is a perspective view of a seat member of a bath aid unit incorporating a drive assembly according to the invention.

FIG. 5 shows a modified form of a seat member as indicated at 16 in FIG. 4, the seat member here being identified by reference numeral 16'. In this case, the drive assembly 19 comprising the motor 9 is disposed closely beneath the seat member 16' with the guide tube 1 being formed integrally in the seat member 16' at the underside thereof, for example by being moulded in the seat member 16' which may be a vacuum moulding. The guide tube 1 thus constitutes a tunnel configuration in the body of the seat member 16', and extends from the motor 9 in a straight portion 23 in which the screwthreaded rod 10 is accommodated, followed by a curve through approximately 180° as indicated at 24 so that the guide tube 1 then extends rearwardly towards the rear edge of the seat member 16'. As it approaches the motor 9, the guide tube or tunnel 1 passes upwardly in the body of the seat member 16' in a curve 25 over the top of the motor 9, and then extends downwardly so as to constitute the downwardly facing curve portion, as indicated at 2 in FIG. 1. The transmission arrangement 4 thus extends through the guide tube or tunnel 1 which is now of considerable length by virtue of the illustrated configuration, and the drive assembly operates in the above-described manner with reference to FIGS. 2 and 3.

It will be noted that the drive assembly may be used in a range of different operating situations, apart from being used in connection with a bath aid unit. For example, it may be used in a wheelchair which is adjustable in respect of height, so that its seat member can be raised, for example to reach a shelf at a higher level, or the like.

In a modification of the illustrated drive assembly, a spring may be incorporated in the line of bobbin portions 5 to ensure that they are appropriately held together with a spring force, while, however, permitting deflection of the bobbin portions 5 according to the operating circumstances of the drive assembly. Thus, for example, the spring may be a coil spring disposed in the transmission arrangement 4 at a position which is adjacent to the free end of the screwthreaded rod 10 when the drive assembly is in the retracted position shown in FIG. 2. In that case, two wires or cables may extend through the bobbins or portions 5 from the nut 11 to the end of the spring which is towards the nut 11, and then a single wire extends from the other end of the coil spring through the further bobbin portions 5 to the free end of the transmission arragnement 4, which is the end that faces downwardly in FIG. 1.

It will be appreciated that various modifications and alterations may be made in the above-described constructions according to the invention without thereby departing from the scope of the invention.

What is claimed is:

1. A drive assembly comprising:

an elongate guide means providing a direction of guidance, said guide means having a first end and a second end and including between said ends a curved portion at which said direction of guidance provided by said guide means changes;

a drive means disposed adjacent said first of said guide means, and including:

a drive motor;

a screwthreaded rod extending within said guide means away from said first end and towards said second end and adapted to be driven in rotation by said drive motor;

a nut carried on said screwthreaded rod in screwthreaded engagement therewith; and means adapted to prevent said nut from rotating in said guide means and to permit said nut to move along said guide means whereby said nut is screwed along said screwthreaded rod by rotation of said screwthreaded rod by said drive motor:

an elongate transmission arrangement having a longitudinal direction, and including:

a plurality of portions, and connecting means connecting said portions together in said longitudinal direction of the transmission arrangement in a condition in which said portions are pressed against each other in said longitudinal direction while being adapted to perform limited pivotal movement relative to each other transversely to said longitudinal direction of said transmission arrangement;

the transmission arrangement having a first and which is operatively associated with said nut, and a second end; and the transmission arrangement being adapted to be displaced by a thrust force applied to the first end of the transmission arrangement by said nut in said guide means, between a first position in which said transmission arrangement is retracted into said guide means, and a second position in which at least an end part of said transmission arrangement adjacent said second end of said transmission arrangement extends from the second end of said guide means;

said end part of said transmission arrangement which extends from said guide means in said second position of said transmission arrangement being constituted by transmission arrangement portions which are pressed against each other by said connecting means to constitute a column operable to apply a thrust drive force in the axial direction said column.

2. An assembly according to claim 1, wherein:

said connecting means comprises at least one wire extending through the transmission arrangement portions, to hold said transmission arrangement portions together in the longitudinal direction of the transmission arrangement.

3. An assembly according to claim 1, wherein:

said guide means comprises a tube within which said transmission arrangement is adapted to slide; said tube having a bond configuration providing said curved portion of said guide means.

4. An assembly according to claim 1, wherein:

said drive motor is an electric motor.

5. An assembly according to claim 1, further including:

stop means arranged for restricting movement of said transmission arrangement in relation to said guide means.

6. An assembly according to claim 1, wherein:

said portions of said transmission arrangement comprising shaped parts which are interengageable with each other.

* * * * *